INVENTORS.
MARVIN D. MARTIN
WILLIAM W. SALSIG, Jr.
BY
Roland A. Anderson
ATTORNEY.

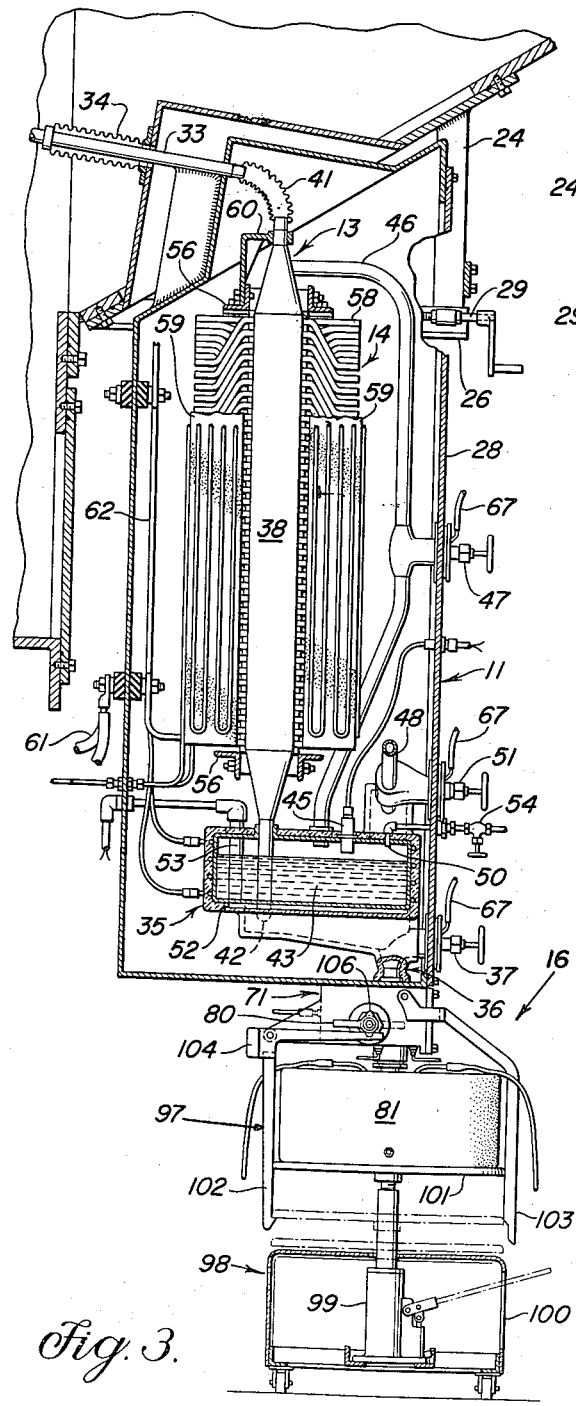
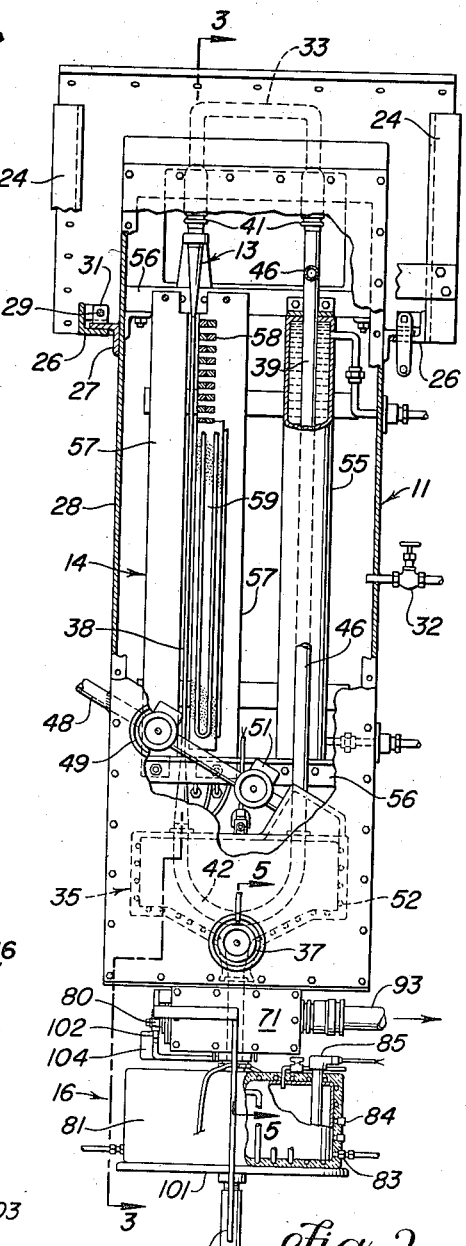
Fig. 3.
Fig. 2.
INVENTORS.
MARVIN D. MARTIN
WILLIAM W. SALSIG, Jr.
BY Roland A. Anderson
ATTORNEY.

Jan. 13, 1959 W. W. SALSIG, JR., ET AL 2,868,987
LIQUID TARGET
Filed Jan. 3, 1952 5 Sheets-Sheet 4

INVENTORS.
MARVIN D. MARTIN
WILLIAM W. SALSIG, Jr.
BY Roland A. Anderson
ATTORNEY.

United States Patent Office 2,868,987
Patented Jan. 13, 1959

2,868,987

LIQUID TARGET

William W. Salsig, Jr., and Marvin D. Martin, Berkeley, Calif., assignors to the United States of America as represented by the United States Atomic Energy Commission Application January 3, 1952, Serial No. 264,724

10 Claims. (Cl. 250—43)

The present invention relates to an improvement in targets for particle accelerators and the like in which a target material is irradiated by bombardment with atomic particles, and more specifically to a liquid target wherein the target material to be irradiated is in liquid form for circulation through the irradiating beam and to the handling and removal of the irradiated liquid target material.

Modern research in the field of physics has added much to the knowledge of atomic particles and the relation of different chemical elements and has, in addition, indicated the feasibility of large scale transmutation of elements, wherein one element is changed into another by such means as bombardment with a beam of high energy atomic particles. The present invention is particularly useful in high energy bombardment work or in large scale transmutations wherein it is desired to subject a large quantity of material to bombardment or wherein the energy, liberated in the form of heat for example, at the target is very large. Conventional targets of the solid type require extensive cooling systems to dissipate heat at the target and have the disadvantage that they are limited in movement so that with a fairly concentrated beam of particles only a small area may be irradiated without changing targets.

The present invention overcomes the above-noted limitations of conventional targets by the provision of a continually moving target which is in liquid form, and thus not only presents a very large amount of target material for irradiation but also carries away heat formed at the target by the particle bombardment. Also, the present invention provides means whereby the irradiated liquid may be removed from the containing structure without danger of contamination of the surrounding atmosphere or danger to the operating personnel.

It is therefore an object of the present invention to provide a new and improved target for irradiation.

It is another object of the present invention to provide an improved liquid target for irradiation.

It is another object of the present invention to provide an improved target assembly having a circulating liquid as the material to be irradiated.

It is another object of the present invention to provide an improved liquid target assembly having safe liquid removal means.

It is another object of the present invention to provide an improved liquid target assembly for a particle accelerator having interlocking liquid drain means providing a closed liquid removal system for maximum safety and protection against contamination.

It is a still further object of the present invention to provide an improved liquid target assembly having a liquid recirculating system for continued irradiation of the liquid.

Numerous other advantages and possible objects of the invention will become apparent to those skilled in the art from the following description and claims taken together with the appended drawings, wherein:

Fig. 2 is an elevation view of a preferred embodiment of the invention having a portion of the casing thereof broken away;

Fig. 3 is a sectional view taken at line 3—3 of Fig. 2;

It is of importance to note at the outset that the present improved target assembly is adapted to be employed in conjunction with a beam or the like of rays or atomic particles. It is contemplated that the liquid of the target will be bombarded by such as X-rays, protons, neutrons or any other desired particle or ray, and while such are commonly produced in apparatus for particle acceleration, as for example a cyclotron, no limitation is intended in the following description by reference to particle accelerators or to cyclotrons, for it will be appreciated that any source may be employed. In this respect an atomic reactor produces such radiation as may be readily utilized as a source of rays or particles. Also, in the following description, the bombarding particles or rays need not be collimated or directed into a well-defined beam; however, for ease of description the bombarding medium is referred to as a beam and such is taken to include either directed or random radiation which may be adequate for the particular application contemplated.

Figure 1:
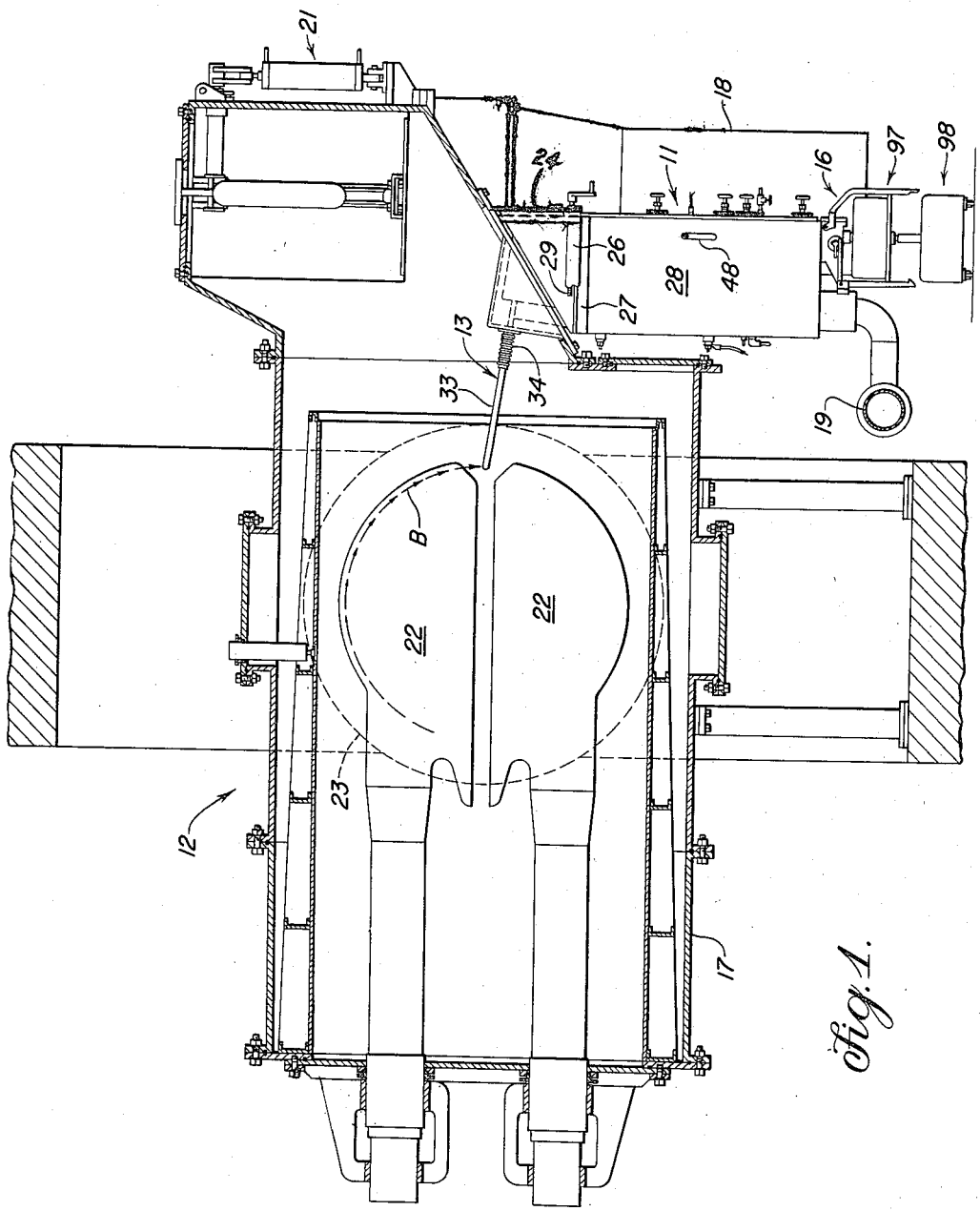
Figure 1 is an elevational view of the invention attached to and operating in cooperation with a cyclotron.

Before proceeding with a detailed description of the elements and operation of the invention, it is best to consider the invention in general as to the main components and general scheme of operation, and thus referring to Figs. 1 and 2, it will be noted that the target assembly 11 is mounted adjacent a particle accelerator such as cyclotron 12. Piping means 13 extend from the target assembly 11 with a portion thereof disposed in the beam of particles from cyclotron 12 and pumping means 14 connected to piping means 13 urge a liquid to circulate through piping means 13 and to thus be subjected to bombardment by the beam from cyclotron 12. Liquid removal means 16 are provided in connection with piping means 13 to remove irradiated liquid in a convenient container such as a drain tank that cooperates with piping means 13 to preclude contamination of the atmosphere and is interlocked therewith to minimize personnel radiation danger.

Considering now the invention in more detail, it will be seen from Fig. 1 that the target assembly 11 is mounted adjacent a conventional cyclotron 12 which is enclosed by a vacuum tank 17. Tank 17 is evacuated by pumping means such as one or more diffusion pumps 18 and backing pumps, not shown, attached to manifold 19 and connected to the tank through appropriate valving having lifting means 21. Internal to tank 17 there is disposed one or more electrostatic particle accelerating means such as dees 22 mounted upon tank 17 and adapted for electrical energization. A magnetic field is established through a portion of tank 17 by pole pieces 23 energized by windings (not shown) and the field is directed normal to the plane of the drawing in the area of dees 22. Particles, such as protons for example, are produced in an ion source (not shown) at the center of dees 22 and are accelerated electrostatically by appropriate potentials applied to dees 22. These particles are constrained to move in a spiral path by the magnetic field acting perpendicular to their direction of acceleration and there is thus produced at the periphery of dees 22 a beam B of accelerated particles that are adapted for bombardment of a target placed in the beam path.

Target assembly 11 is mounted upon the outside of tank 17 by brackets 24 which may be welded directly to the tank wall. Provision is made for adjusting the position of target assembly 11 in order to properly orient same with respect to the beam B and this may include angle irons 26 secured to brackets 24 and slidably engaging angle irons 27 mounted upon target housing 28, as shown. Adjustment of the position of target housing 28 is produced by a pair of threaded shafts 29 mounted for rotation upon bracket angles 26 and threadably engaging nuts 31 rigidly mounted upon housing angles 27. A crank handle may be provided to rotate shafts 29 whereby housing 28 moves toward or away from cyclotron tank 17; however, it is to be noted that the degree of motion of target housing may be quite limited and in a practical application may need not exceed one-half of an inch.

Target housing 28 is preferably fabricated so as to be vacuum tight and all connections thereto are made vacuum tight by suitable means such as gaskets. An access valve 32 is provided in one wall of target housing 28 through which the housing may be evacuated or alternatively filled with an inert gas, preferably at less than atmospheric pressure. Disposed internal to housing 28 is piping means 13 which include a substantially U-shaped tube 33 extending outside of housing 28 and into cyclotron tank 17. Appropriate vacuum sealing means are provided at the points where U tube 33 pierces tank 17 and the seal preferably includes an expansible means such as bellows 34 which act to accommodate the aforementioned adjusting motion of target housing 28 to which U tube 33 is secured. U tube 33 is formed with sufficient length to extend the desired distance into cyclotron tank 17 so as to intercept beam B therein and it is this tube 33 that contains the material to be bombarded by beam B. In order that the material contained by U tube 33 may be bombarded without attenuation of the bombarding beam, tube 33 is formed of a material that is transparent or pervious to beam B and it will be appreciated that the substance of which tube 33 is formed is dependent upon the type of beam employed and the energy thereof, and for example tube 33 may be formed of tantalum and have a wall thickness of about .010 inch when a proton beam of 20 to 25 million electron volts is employed for bombardment. Also it is not necessary that all of U tube 33 be formed of a material that is transparent to the bombarding beam, as only the portion thereof that is disposed directly in the beam need be so constituted.

In addition to U tube 33, piping means 13 includes a liquid reservoir 35 rigidly mounted upon the bottom of target housing 28 and having an outlet port 36 in the bottom thereof for the draining of liquid therefrom. An outlet valve 37 is disposed in outlet port 36 and extends through the wall of target housing 28 for ease of operation thereof (as described in more detail below). A pair of substantially straight pipes 38 and 39 extend from U tube 33 to reservoir 35 and these pipes may be connected to U tube 33 by flexible couplings 41. A curved tube or pipe 42 is disposed within reservoir 35 and has the ends thereof extending through the top of reservoir 35 in sealed relation thereto. Curved pipe 42 is connected to straight pipes 38 and 39 to form with U tube 33 a closed loop for the circulation of liquid therethrough. Within reservoir 35 there is provided a liquid 43 which is adapted to be circulated through the above-noted piping loop and which enters same through a small aperture 44 formed in curved pipe 42 within reservoir 35. There is further provided a by-pass line 46 which is connected to straight pipe 39 at the top thereof adjacent flexible coupling 41 and extends into reservoir 35 in sealed relation with the wall pierced thereby. A flow control valve 47 is disposed in by-pass line 46 to provide an orifice of variable size for controlling the flow of liquid therethrough, and valve 47 has the stem thereof extending through the wall of target housing 28 with the attached handwheel disposed outside of housing 28 for ease of operation. By varying the size of the orifice of control valve 47 the amount of liquid 43 that is by-passed directly to reservoir 35 is controlled and thus the amount of liquid entering the piping loop through the aperture 44 in curved pipe 42 is likewise controlled, as is set out in more detail in the following description of operation.

Figure 4:
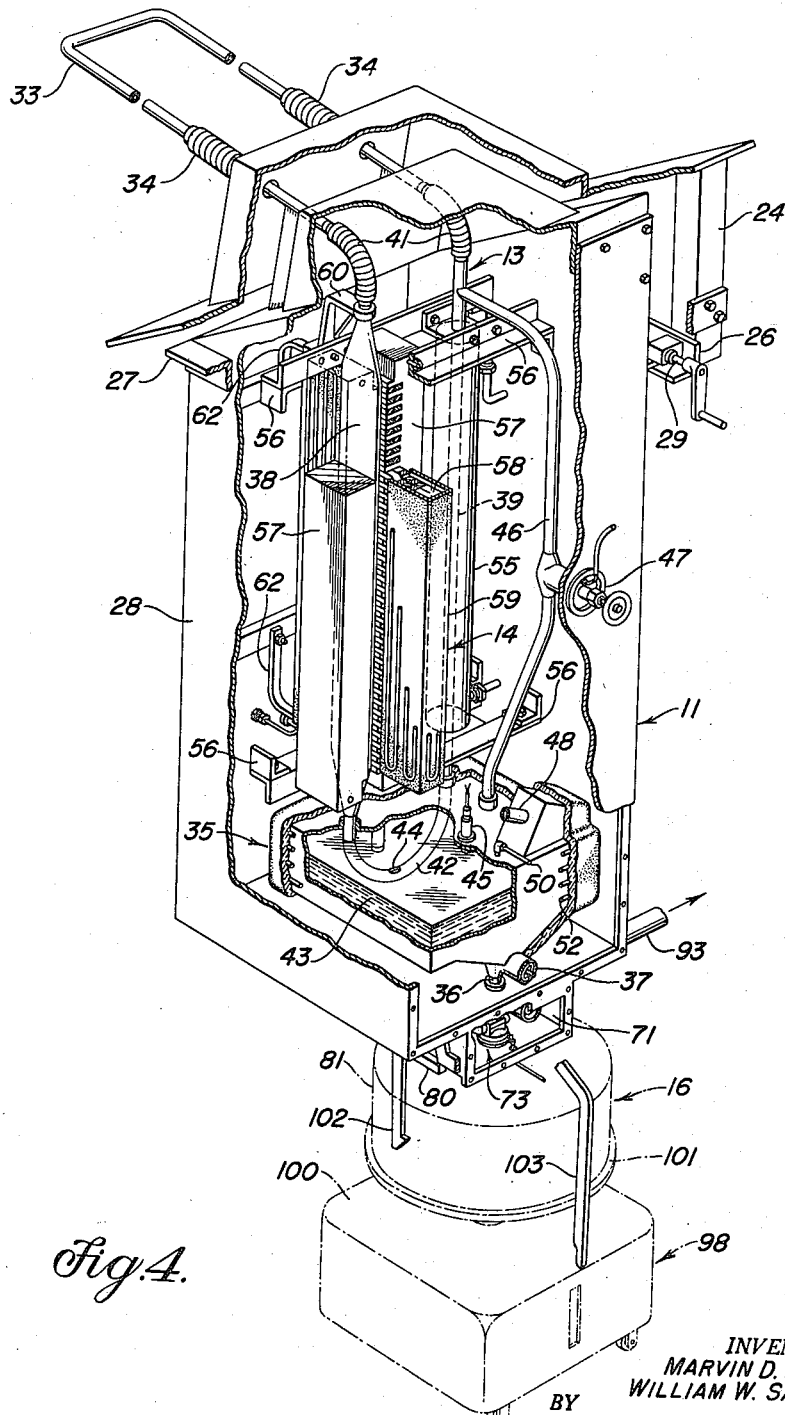
Fig. 4 is a perspective view with portions broken away to show the internal arrangement of the elements.

Inlet or charging means are provided for filling reservoir 35 and in the illustrated embodiment such means may take the form of a pipe or tube 48 extending in a straight line from reservoir 35 through the wall of target housing 28 with a pair of valves 49 and 51 disposed therein and defining an air lock therebetween. These valves are separated a definite distance and by alternately opening the valves the reservoir may be filled or recharged without opening same to the outer atmosphere. Although any desired liquid may be used in the present invention, it is contemplated that a metal in liquid form will be employed and thus it is necessary to make provision for liquefying same from its ordinary solid state. For this purpose, reservoir 35 is provided with heating means, such as electric coils 52 wound thereabout, and is insulated so as to retain the heat added thereto. Also, if the charge added to reservoir 35 is in solid form, it is preferably formed as short billets of a diameter less than reservoir inlet pipe 48, and the inlet pipe is thus made substantially straight to handle these billets. To prevent undue curvature of inlet pipe 48, reservoir 35 may be provided with an upward extension into which inlet pipe 48 extends, as shown in Figs. 2 and 4.

Reservoir 35 may also be provided with a liquid level indicator 53 of any suitable type resistant to molten metal and preferably being remote reading as by electrical leads extended through a wall of target housing 28 to provide liquid level indications exterior to housing 28. Also connected to reservoir 35 is a counter or radiation detector 45 having leads extending to a meter external to housing 28 and a priming line 50 having a gas cock 54 therein and leading to an external source of gas under pressure (not shown).

Piping means 13 further includes cooling means 55 which may be disposed about straight pipe 39 and may take the form of a cylinder sealed about pipe 39 at both ends thereof and having connections extending outside of target housing 28 to a supply of cooling medium (not shown). Cooling cylinder 55 may be supported by attachment to structural members 56 mounted upon the walls of target housing 28 and extending thereacross interiorly thereto as shown. It is to be noted that the necessity of cooling means 55 is not dependent upon the use of a molten metal as the liquid in the target assembly, for the purpose of the cooling means is to remove a portion of the heat imparted to the liquid by the bombardment thereof. Thus, the necessity of cooling means is dependent upon the energy of the bombarding beam, the rate of flow of the liquid, and other factors affecting the amount of heat added to the liquid in its cycle through the piping loop.

A further integral part of target assembly 11 is pumping means 14 which is disposed within target housing 28 and which operates in conjunction with piping means 13 to force liquid 43 to circulate therethrough. While various types of pumps are suitable for the aforesaid function, it has been found that an induction pump is particularly desirable when the liquid 43 is a molten metal. Such a pump is illustrated in the drawings as being disposed about straight pipe 38 which is formed in a flat configuration over a considerable length thereof. Pipe 38 in flattened form as shown presents a large lateral area with a fairly thin cross section of liquid flowing therethrough. On each of the flat sides of flattened pipe 38 there is disposed a magnetic pole piece 57 extending lengthwise of pipe 38. These pole pieces are preferably formed of laminated steel and one of the pole pieces is slotted to contain electrical windings 58. These windings 58 extend beyond the sides of the slotted pole pieces and are preferably enclosed, as by an envelope 59. Pole pieces 57 may be mounted upon structural members 56 to hold them in position with respect to pipe 38 and pole pieces 57, and contained windings 58 are disposed directly adjacent pipe 38 so that a minimum air gap results therebetween. Flattened pipe 38 is held in position between pole pieces 57 by a bracket 60 which is mounted upon members 56, and cooling tubes are provided upon pump 14 as shown to prevent overheating of the pump windings.

Electrical energization of pump windings 58 is provided from an alternating current power source (not shown) disposed exterior to target housing 28 and connected by means of electrical leads 61, through lead-through insulators in the wall of target housing 28, to bus bars 62 mounted in insulated relation upon the inside of a wall of target housing 28. Electrical connection from windings 58 are made to bus bars 62 and also electrical connection may be made from the heating coils 52 of reservoir 35 to bus bars 62, although if such connection is made there is preferably provided a remotely controlled switch in the leads to the heating coils so that they may be turned on and off without affecting operation of the pump.

It will be appreciated that bombardment of liquid 43 with beam B of high energy particles produces a certain amount of radioactivity, and it is important to prevent same from escaping from the closed system of the target assembly 11. This presents a particular problem in the removal of the bombarded liquid from reservoir 35 in that it is necessary to prevent the liquid from exposure to the ambient atmosphere and also to prevent contamination of the removal means in order that same may be safely handled by operating personnel. The present invention provides a liquid removal means cooperating with the above-described piping means 13 to provide a safe and easy liquid removal wherein no gases may escape, no contact may be had between the liquid and the atmosphere external to target housing 28, and no contamination of the exposed portions of the removal container is possible.

Figures 5, 7:
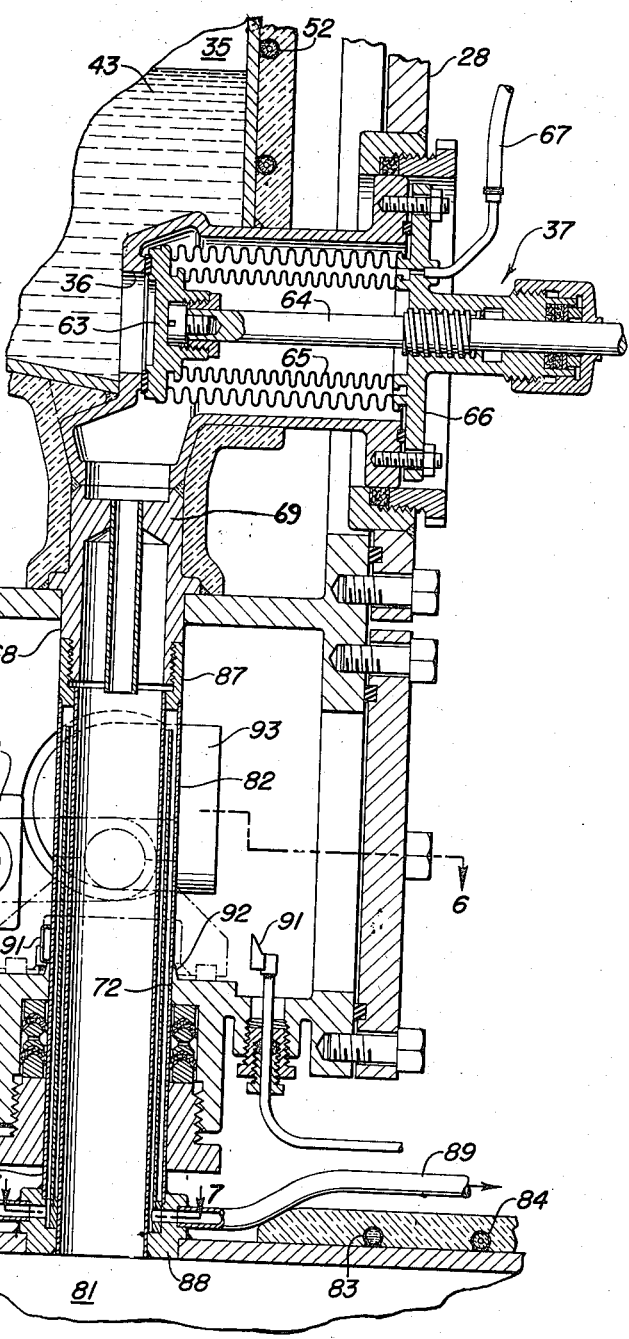
Fig. 5 is a sectional view in elevation of the drain lock chamber and associated elements taken at line 5—5 of Fig. 2.
Fig. 7 is a section view taken at line 7—7 of Fig. 5.
Figure 6:
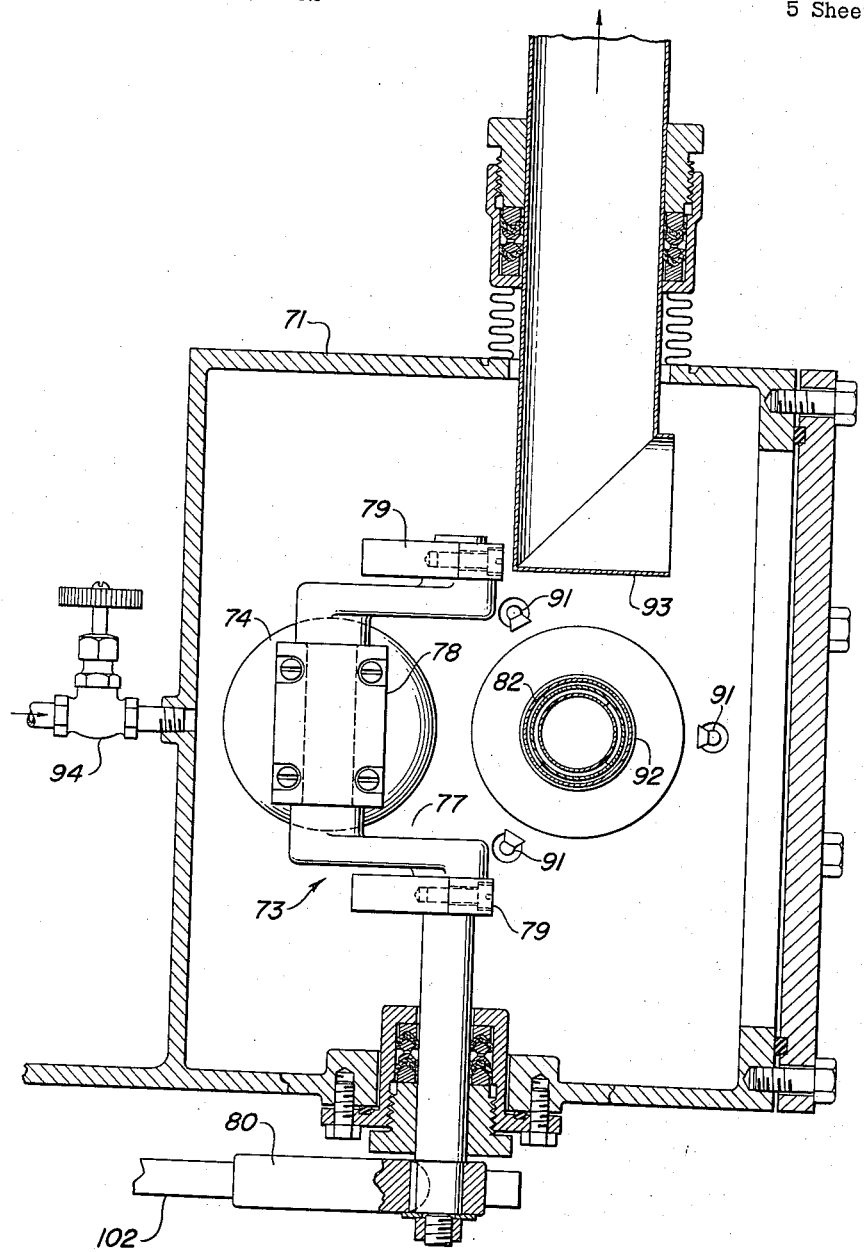
Fig. 6 is a plan view in section of the drain lock chamber taken at line 6—6 of Fig. 5.

Referring now to the illustrated embodiment of the liquid removal means 16, and Figs. 5 and 6 in particular, it will be seen that outlet port 36 of piping means 13 is disposed at the bottom of reservoir 35 which preferably slopes toward outlet port 36, as shown, to insure complete drainage of liquid therethrough. Outlet or drain valve 37 is disposed with the valve head 63 thereof in normal closing relation to outlet port 36. The stem 64 of drain valve 37 extends through the wall of target housing 28 and suitable sealing means are provided to insure an air-tight connection at this point. As shown in Fig. 5, drain valve 37 is movable by rotation of the stem 64 thereof to displace valve head 63 and to thus open outlet port 36 for the drainage of liquid 43 therethrough. As a precaution against air leakage a double Sylphon bellows system may be mounted about valve stem 64 and extending from valve head 63 to the valve housing 66 secured to target housing 28 and a pump-out connection 67 may be joined to bellows system 65 to evacuate the space between the two concentric bellows elements. This arrangement accommodates the movement of valve head 63 and at the same time prevents leakage about valve stem 64. Suitable vacuum means (not shown) may be connected to pump-out connection 67 and preferably continuous pumping is employed with the vacuum exhaust being filtered and tested for radioactivity. Flow control valve 47 may be formed much as drain valve 37, above described, and vacuum means may also be joined to pump-out connections 67 communicating with seals on valves 47, 49, and 51, as well as valve 37.

There is provided adjacent outlet port 36, and in communication with same through drain valve 37, an outlet pipe 68 which is fitted into footing 69 for reservoir 35. Outlet pipe 68 extends through the bottom wall of target housing 28, being sealed thereto in air-tight connection, and has external threads formed about the end thereof outside of target housing 28. Below target housing 28 and enveloping outlet pipe 68 is a drain lock chamber 71 having air-tight walls and joints and being secured to target housing 28. The purpose of drain lock chamber 71 is to prevent escape of radioactive gases or liquids from the interior of housing 28 and to provide means for loading a receptacle with irradiated liquid without undue contamination of the receptacle. Outlet pipe 68 extends into drain lock chamber 71 through the top thereof, and aligned with outlet pipe 68 is an aperture 72 in the bottom of drain lock chamber 71.

There is provided for aperture 72 closure means 73 which has open and closed positions relative thereto to controllably provide access to drain lock chamber 71 from the exterior thereof. Closure means 73 may include a valve head 74 having sealing means thereabout, such as a gasket 76, and having the proper dimensions to fit over aperture 72 and close same as by engagement of gasket 76 with the bottom wall of drain lock chamber 71. Closure means 73 is preferably disposed within drain lock chamber 71 and includes an off-set shaft 77 adapted to be clamped to valve head 74 by such as a cover plate 78 bolted to valve head 74 and containing shaft 77 in bearing relation thereto with freedom of rotation with respect thereto. A pair of bearings 79 are mounted within drain lock chamber 71 about off-set shaft 77 with one on each side of the off-set portion thereof to maintain shaft 77 in position, and shaft 77 is extended through a wall of drain lock chamber 71 with sealing means thereabout and a crank handle or the like 80 mounted on same exterior to the chamber for rotation of shaft 77 and closure means 73. Off-set shaft 77 is mounted by bearings 79 adjacent aperture 72 so that rotation of shaft 77 swings valve head 74 from engagement with aperture 72 through an arc away from aperture 72 to rest upon the bottom of drain lock chamber 71. Thus, the amount that valve head 74 moves away from aperture 72 is twice the amount of off-set of shaft 77 as the off-set is the radius of the arc through which valve head 74 moves.

Drainage of liquid 43 from piping means 13 is made into a special drain tank 81 which is entirely enclosed except for a tube 82 extending therefrom and formed for entry into aperture 72 in drain lock chamber 71. Drain tank 81 is insulated and has cooling means connected thereto, such as cooling coils 83 wound thereabout, and may also have secured thereto heating means such as heating coils 84 wound adjacent cooling coils 83. Drain tank tube 82 has the end thereof disposed exterior to drain tank 81 internally threaded to engage a cap 86 which is externally threaded to close tube 82. Cap 86 has a square indentation formed in the top thereof outside of tube 82 for engagement with closure means 73 as noted in more detail below. Drain tank tube 82, instead of being formed as a single unit or element, may have integral cooling means to keep the external surface thereof cool and to this end may comprise three thin-walled concentric cylinders having only a small separation therebetween and joined together at the top by a ring member 87 and at the bottom by an apertured retainer ring 88, shown in detail in Fig. 7. Retainer ring 88 has connected thereto cooling water inlet and outlet pipes 89 and is slotted or apertured to connect the inlet pipe to the space between the outer and central cylinders, and to connect the outlet pipe to the space between the central and inner cylinders. The central cylinder is not connected to top ring member 87 as are the inner and outer cylinders but instead is separated slightly therefrom so that communication is provided between the spaces between cylinders at the top thereof. With the above-noted configuration and connection of elements, it will be seen that cooling water or other medium flowing in the inlet pipe will rise between the outer and central cylinders to the top thereof and will then spill over into the space between the central and inner cylinders and flow out the outlet pipe. Drain tank 81 is also preferably provided with a liquid level gauge 85 to indicate the amount of liquid in tank 81.

Drain lock chamber 71 is provided with certain other elements and features to accommodate engagement with tube 82 of drain tank 81, among which is a cylindrical protuberance or guide 90 about aperture 72 in which there is disposed gasket means, such as chevron packing, which is held in place when tube 82 is in aperture 72 by means of a ring threadably engaging protuberance 90 and applying pressure to the packing. Also provided internal to drain lock chamber 71 are one or more nozzles 91 which are directed toward tube 82 (when inserted in drain lock chamber 71) and which are connected through a wall of chamber 71 to a pressurized supply of plastic which is controllably actuated exterior to chamber 71 to spray plastic through nozzles 91 upon tube 82 as noted in more detail below. Operating in cooperation with nozzles 91 is a scraper or knife ring 92 which is mounted about aperture 72 in chamber 71 and disposed with the sharpened edge thereof directed inwardly of chamber 71. Scraper 92 has substantially the same diameter as the outer diameter of drain tank tube 82 and thus when drain tank tube 82 is retracted or removed from chamber 71, scraper 92 removes the plastic coating that has been applied thereto by nozzles 91. There is also provided in drain lock chamber 71 an exhaust line 93 which extends through a wall of chamber 71 to a vacuum and filter system (not shown) and which may be movable within chamber 71 to best pick up and exhaust stray material and gas therein. A gas cock 94 in a wall of chamber 71 provides for flushing the chamber to remove all radioactivity therein.

Figure 8:
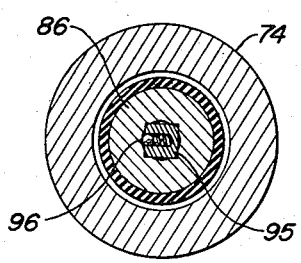
Fig. 8 is a section view taken at line 8—8 of Fig. 5.

Closure means 73 has a further function of engaging and retaining cap 86 of drain tank tube 82 and this is accomplished by the provision in the lower face of valve head 74 of closure means 73 an indentation of sufficient size to accommodate cap 86 of drain tank tube 82 and a square pin 95 which mates with the indentation in the top of cap 86 (shown in detail in Fig. 8). A spring mounted ball 96 is fitted into a slot in pin 95 that is turned over to retain ball 96 with a portion protruding therefrom, and thus ball 96 is movable against the force of the spring mounting thereof into the slot therefor. Spring mounted ball 96 provides cap retaining means which is operable to hold cap 86 in the indentation in valve head 74 when cap 86 is not connected to tube 82 and to release cap 86 when same is connected to tube 82.

In addition to the above-noted elements of the invention there is provided interlock means 97 which may be disposed external to drain lock chamber 71 as by mounting thereon and which serves the purpose of preventing the opening of drain lock chamber 71 when drain tank 81 is out of engagement therewith, and further prevents the removal of drain tank tube 82 from drain lock chamber 71 without placing closure means 73 in closed position. For ease and convenience of handling drain tank 81, there is also provided handling means 98 and it will be apparent that various interlocking means 97 and handling means 98 may be employed; however, the illustrated embodiment of these elements has proven advantageous in simplicity of construction and operation. The illustrated handling means 98 includes a hydraulic jack 99 mounted on a car or truck 100 that may ride on tracks and may further be remotely controlled, if desired, as may be jack 99. As a simplification to the interlock means 97 drain tank 81 may rest upon a platform 101 extending beyond the sides of drain tank 81 and this platform while preferably connected to drain tank 81 may be mounted upon the top of jack 99. The illustrated interlock means 97 includes a pair of offset arms 102 and 103 of which arm 102 includes a horizontal portion extending directly beneath closure means crank handle 80. Arm 102 also includes a substantially vertical portion with a hooked end adapted to fit under platform 101 and is pivoted at the outer end of the horizontal portion. The vertical portion of arm 102 extends down the side of drain tank 81 and a weight 104, forming a part of arm 102 outside of the pivot point thereof, urges the vertical portion of arm 102 toward drain tank 81 so that the hook thereon tends to be disposed beneath platform 101 and the horizontal portion bears on the under surface of the pivot end of crank handle 80. A cam 106 upon crank handle 80 engages the horizontal portion of arm 102 to pivot arm 102 away from drain tank 81 when closure means 73 is in closed position and to thus move the hook on the end of the vertical portion of arm 102 away from platform 101 to allow platform 101 and drain tank 81 to be lowered.

Arm 103 of interlock means 97 is pivoted adjacent crank handle 80 and extends outwardly and down the side of drain tank 81 so that its center of gravity is positioned to pivot it against platform 101 which has a slightly greater diameter than drain tank 81. The top of arm 103 is formed to rest above crank handle 80 when arm 103 is out of engagement with platform 101 so that crank handle 80 cannot be moved to open closure means 73, and the bottom end of arm 103 is cut at an angle so that when platform 101 is moved upward against it arm 103 pivots outwardly to move away from crank handle 80 and releases it for movement.

Considering now the operation of the above-described embodiment of the invention and assuming disposition of the target assembly 11 adjacent a source of particles, such as the cyclotron 12 of Fig. 1 and appropriate interconnection thereof so that tube 33 is disposed in part in the beam of particles of cyclotron 12, reservoir 35 is charged with a material to be bombarded. In the case where a liquid metal is to be irradiated the metal would ordinarily be in solid form prior to introduction into target assembly 11 and it has been found convenient for handling and storing to form the metal in the shape of short circular or cylindrical billets having an outer diameter less than the inner diameter of the inlet pipe 48. A number of the billets of metal are slid into pipe 48 and then inlet valve 49 is opened, care being taken that second inlet valve 51 is closed during the time that valve 49 is open. Valve 49 is then closed so that a number of billets of metal are disposed in the air lock intermediate valves 49 and 51 in inlet pipe 48 and then valve 51 is opened to allow the billets to fall into reservoir 35 and valve 51 is reclosed. The air lock intermediate valves 49 and 51 may, if desired, be flushed to remove gases therein after charging reservoir 35 by connecting a vacuum system to line 48 and opening valve 49. It will be appreciated that during the charging process, as above described, there is at no time direct communication between reservoir 35 and the exterior of target assembly 11 and that whatever contaminated gases or the like may be present in piping means 13 or reservoir 35 they are contained therein and prevented from escaping.

The target material in reservoir 35 is melted by energizing the heating coils 52 of the reservoir from an external power supply (not shown) and in liquid form the metal or other material in reservoir 35 is then ready for circulation through piping means 13. Circulation is accomplished by pumping means 14 which is connected in piping means 13; however, it will be appreciated that pump 14 has no suction head and thus must be primed and this is accomplished through priming line 50. A gas is introduced into reservoir 35 through line 50 and stop cock or valve 54 to exert a pressure upon the surface of liquid 43 in reservoir 35 and force the liquid up pipes 38 and 39 and into the pump portion of pipe 38 where pumping means 14 may act upon it. By-pass valve 47 must be closed during priming to prevent pressure equalization. Preferably helium is employed to prime piping system 13 because it is inert and has a minimum activity when bombarded, but other gases may be used. With the type of pumping means shown, windings 58 are energized through bus bars 62 and electrical connections 61 from a power source (not shown) to produce a magnetic field between pole pieces 57. The magnetic field established between pole pieces 57 moves along the flattened pipe 38 disposed intermediate thereto because of the alternating current energizing windings 58, and this moving magnetic field acts upon the liquid in reservoir 35 and flattened pipe 38 to move it through piping means 13. Inasmuch as liquid metal pumps are known in the art, no detailed description thereof is included herein and for a more complete description thereof, reference is made to the publication, Liquid Metals Handbook Navexos, p. 733, and to British Patent No. 303,065.

With pumping means 14 operating to urge liquid 43 through piping means 13 a flow of liquid is established in a complete loop including pipe 38, U tube 33, pipe 39 and curved pipe 42 in reservoir 35. In order to control the percent of liquid that is continuously recirculated and to conserve the velocity head of the liquid, control valve 47 is employed. By varying the size of the orifice in control valve 47 the amount of liquid entering reservoir 35 directly and by-passing curved pipe 42 is controlled, and as pumping means 14 acts to maintain piping means 13 full of liquid, the amount of liquid that is passed through by-pass line 46 by valve 47 is made up in the piping system by drawing liquid directly from reservoir 35 through the aperture 44 in curved pipe 42. It will be seen that the liquid that is circulated through piping means 13 and bombarded by beam B is continually being depleted by drain-off through by-pass line 46 and continually added to from reservoir 35 through filling aperture 44 in curved pipe 42 so that the percentage of recycled liquid is controlled by by-pass control valve 47. As stated above, cooling means 55 is provided to remove a part of the heat that is liberated or produced by the irradiation of liquid 43 by beam B and, of course, the amount of cooling required is dependent upon the irradiation, as it is necessary to leave enough heat in liquid 43 to keep it in a liquid state. After initial melting of the material to be irradiated, it is not ordinarily necessary to add heat thereto in reservoir 35 inasmuch as sufficient heat is liberated in the bombardment of the liquid to keep it in a liquid state.

In the process of irradiation, it is necessary to align the target with the beam of particles which are to do the bombarding and the above-noted adjusting means operated by crank handles upon the shafts 29 are employed to position the end of U tube 33 directly in line with beam B to intercept same. It will, of course, be appreciated that the bombarding particles must first pass through U tube 33 before they strike liquid 43 and, consequently, at least a part of U tube 33 must be formed of a material that is transparent to incident particles.

Following irradiation of liquid 43 to the desired extent, liquid 43 is drained from piping means 13 and a new charge introduced. Ordinarily, irradiated liquid 43 is radioactive and a certain amount of radioactive gases and vapors are unavoidably present in piping means 13, mostly in reservoir 35. This poses a problem of liquid removal which is accomplished in the present invention by means of drain lock chamber 71, drain tank 81, and above-noted associated elements as described in some detail below.

During operation of the target assembly and irradiation of a liquid 43 circulated therethrough, outlet valve 37 in the bottom of reservoir 35 is maintained in normally closed position so that no liquid exit is available. Also, closure means 73 is maintained in position with valve head 74 in closing relation to the aperture 72 in drain lock chamber 71 and drain tank 81 may be disposed in any convenient location inasmuch as it is not used or needed during this time; however, cap 86 is preferably left in closing relation to drain tank tube 82 at all times that access to the interior of drain tank 81 is not required. When a part of irradiated liquid 43 is to be removed from the piping means of target assembly 11 drain tank 81 is moved on a truck 100 or the like into position below drain lock chamber 71 and is raised by jack 99 so that drain tank tube 82 is inserted in the protruding guide or cylinder 90 in the wall of drain lock chamber 71 about aperture 72 therein, and cap 86 on tube 82 is engaged by pin 95 in closure means 73 which mates with the indentation in the top of cap 86. Drain tank 81 and attached tube 82 are then rotated and, as closure means 73 prevents cap 86 from rotating, cap 86 is unscrewed from tube 82. The upward movement of drain tank 81 moves interlock arm 103 outward to release handle 80 which is then rotated and shaft 77 of closure means 73 swings valve head 74 out of engagement with aperture 72 in drain lock chamber 71 and by virtue of the holding action of spring loaded ball 96 in pin 95, cap 86 is retained in the indentation in valve head 74 and is removed from tube 82. At this point communication is provided between the interior of drain lock chamber 71 and drain tank 81 as drain tank tube 82 is open and closure means 73 is moved to open position. Drain tank 81 is then moved upwards through drain lock chamber 71 as guided by the cylindrical protuberance 90 in the wall thereof about aperture 72, and as tube 82 is moved upwards plastic from nozzles 91 is sprayed upon tube 82. As tube 82 reaches the top of drain lock chamber 71, drain tank 81 and attached tube 82 are rotated to engage the threaded end of tube 82 with the threaded pipe 68 extending into the top of drain lock chamber 71. It will be appreciated that with wide angle nozzles 91 preferably spaced about tube 82, the entire outer surface of tube 82 is covered with plastic when tube 82 is rotated to threadably engage pipe 68. Drain tank 81 may, of course, be handled in a variety of ways during the above-described process and there is illustrated merely for convenience and completeness a hydraulic system 99 upon which drain tank 81 may be mounted and raised.

With tube 82 in engagement with pipe 68 in drain lock chamber 71, communication is provided from outlet valve 37 directly to the interior of drain tank 81 and thus outlet valve 37 may be opened by unseating the valve head 63 thereof whereby liquid 43 flows by gravity through pipe 68 and attached tube 82 into drain tank 81. Preferably tube 82 is cooled during the flow of liquid 43 therethrough as by connecting cooling tubes 89 to a circulating cooling water system or the like to prevent the plastic coating on the outside of tube 82 from being melted by the heat of liquid 43. When the desired amount of liquid 43 has been drained from reservoir 35 and piping means 13, outlet valve 37 is closed to again close piping system 13, which may then be recharged to full capacity in the manner described above and further irradiation accomplished. With liquid 43 in drain tank 81, connection is made from cooling pipes 83 about drain tank 81 to an appropriate source of coolant, such as water, and liquid 43 is thereby cooled and solidified. Cooling of tube 82 and drain tank 81 also acts to condense the vapors present and to thus minimize the escape of radioactive material. Drain tank 81 is then rotated to unscrew tube 82 from pipe 68, and drain tank 81 and tube 82 are lowered until the end of tube 82 is just inside of drain lock chamber 71, at which point tank 81 is held by engagement of interlock arm 102 with platform 101. As tube 82 is moved downward through drain lock chamber 71 scraper 92 about aperture 72 removes the plastic coating about tube 82 and thus as tube 82 emerges from drain lock chamber 71, it has no radioactive deposits whatsoever on the external surface thereof. The plastic coating removed from tube 82 by scraper 92 is withdrawn from drain lock chamber 71 through exhaust means 93 as are any residual gases or vapors in drain lock chamber 71 or tube 82, and all harmful radioactivity removed therefrom by suitable filtering apparatus exterior to target assembly 11 (not shown). In this respect, a complete flushing of drain lock chamber 71 may be accomplished by opening valve 94 which causes a draft of air to pass through chamber 71 and out exhaust 93.

With tube 82 in the above-described position, closure means 73 is moved into closing relation with aperture 72 in the wall of drain lock chamber 71 by rotating handle 80 and attached shaft 77, and cap 86 retained by closure means 73 is thus placed upon tube 82. Subsequent rotation of drain tank 81 and attached tube 82 screws cap 86 upon the end of tube 82, inasmuch as cap 86 is held from rotation by closure means 73, and following complete engagement of cap 86 with tube 82 drain tank 81 is completely sealed for removal from drain lock chamber 71. The rotation of crank handle 80 to the closed position of closing means 73 engages cam 106 with the horizontal portion of interlock arm 102 which then forces the hook thereof away from platform 101 so that drain tank 81 may be lowered. After capping, drain tank 81 is lowered by jack 99 out of engagement with drain lock chamber 71 and is removed upon truck 100 for processing of irradiated liquid 43. It will be appreciated that drain lock chamber 71 is at all times sealed from the external atmosphere during the filling of drain tank 81 and before and after same by closure means 73 which, through valve head 74, closes aperture 72 in the wall of drain lock chamber 71.

From the foregoing description of operation of the invention, as referenced to the preferred embodiment illustrated, it will be seen that there is provided by the present invention an improved bombardment target wherein the material to be irradiated is constantly changed to overcome heating effects and to provide a large quantity of target material for bombardment. By the provision of a liquid target the present invention makes possible the large scale transmutation of elements and the use of very large current bombarding beams. In addition to the broad and far reaching improvement comprising a liquid target, the present invention further presents a particularly advantageous means for circulating and handling the liquid to be irradiated. The difficulties of handling radioactive liquids has been entirely overcome by the provision of the novel liquid removal means including the drain lock chamber and its manner of and means for engaging the drain tank in which the irradiated liquid is finally placed for convenient shipping or removal to appropriate "hot laboratories" or the like for final processing or utilization.

Although the present invention has been disclosed with respect to a preferred embodiment it will be appreciated by those skilled in the art that numerous modifications and variations are possible within the spirit and scope of the invention and thus it is not intended to limit the invention to the specific details described and illustrated, and attention is directed to the following claims for a definition of the invention.

What is claimed is:

1. In a liquid target assembly for a particle accelerator the combination comprising, piping means formed in a closed loop and adapted to extend into a beam of particles from a particle accelerator, said piping means having liquid inlet and outlet ports, a drain lock chamber communicating with the liquid outlet port of said piping means and having an aperture therein for draining said piping means, closure means connected to said drain lock chamber and movable between open and closed positions relative to the aperture in said drain lock chamber, and a drain tank having an inlet tube thereon and being movable with respect to said drain lock chamber and piping means, said drain tank inlet tube having a removable cap thereon and being formed to be inserted in the aperture in said drain lock chamber, said closure means engaging the inlet tube of said drain tank when same is inserted in the aperture in said drain tank and uncapping said tube upon insertion thereof to provide communication between said piping means and said drain tank and recapping said tube upon retraction thereof whereby the interior of said drain tank is open only to communicate with said piping means and is closed to external atmosphere.

2. In a liquid handling system for radioactive materials having an outlet port, valve means, a drain lock chamber communicating with the outlet port through said valve means and having an aperture therein, a drain tank being removable with respect to said drain lock chamber and having a tube extending therefrom formed for insertion in said drain lock chamber through the aforesaid aperture therein and for retraction therefrom, a cap threadably engaging said drain tank tube to close said drain tank, carrying means engaging said drain tank for translating and rotating same, and closure means disposed within said drain lock chamber and mounted for movement relative to the aperture therein to open and close same, said closure means being formed for slidable engagement with and retention of the cap for said drain tank tube in the closed position of said closure means whereby insertion of said tube into the said drain lock chamber through the aperture therein and rotation thereof by said carrying means removes the cap from the tube, and said drain tank being adapted for further translation by said carrying means to engage the tank tube with said valve means for providing communication between said piping means and said drain tank for draining said piping means within a closed system.

3. A liquid handling system for a radiation target comprising a liquid reservoir having an outlet port, means defining an apertured drain lock chamber about said outlet port, a removable drain tank having a tube extending therefrom for engagement with the aperture in said drain lock chamber, a cap threadably engaging said tube at the end thereof to close same, and closure means disposed within said drain lock chamber including a plug mating with the aperture in said drain lock chamber to close same and an arm carrying said plug and being mounted for rotation to move said plug into and out of closing relation with the aperture in said drain lock chamber, said plug and said cap being formed to mate together and said plug having releasable retaining means attached thereto whereby rotation of said tube when in engagement with the aperture in said drain lock chamber and with said cap and plug in mating relation unscrews said cap from said tube and subsequent rotation of the plug and arm of said closure means out of closing relation with the aperture in said drain lock chamber provides communication between said piping means and said drain tank.

4. In a liquid handling system for radioactive materials having an outlet port, means defining a sealed apertured chamber about said outlet port, closure means mating with said aperture and being mounted for movement between open and closed position with respect to said aperture, a removable drain tank having a tube extending therefrom adapted to be inserted in the aperture in said chamber and to engage said outlet port, nozzle means disposed within said chamber and directing upon said tube a spray of protective coating, and scraping means disposed about said apertures in contact with said tube inserted therethrough to remove from said tube upon retraction from said chamber the protective coating applied thereto by said nozzle means whereby said tube is protected when inserted in said chamber and a safe drain for said piping means is provided.

5. A handling system for radioactive fluids adapted for connection to apparatus having an outlet port, means defining a chamber about said outlet port in communication therewith, said chamber having an aperture in a wall thereof, closure means within said chamber having open and closed positions with respect to said chamber aperture, a drain tank having a tube formed for insertion in the aperture in said chamber in sealing relation therewith, a cap removably disposed upon said tube to seal said drain tank, nozzle means disposed within said chamber and directed substantially toward said aperture therein to spray a protective coating upon said tube when inserted in said chamber for engagement with the outlet port in said piping means, and scraping means disposed about the aperture in said chamber and removing from said tube upon retraction from said chamber the protective coating applied upon insertion thereof whereby the external portions of said tube is uncontaminated by insertion in said chamber for draining said piping means.

6. In a liquid target assembly the combination comprising, piping means formed for carrying a liquid to be irradiated and having an outlet port, means defining a drain lock chamber about said oulet port and having an aperture therein, a drain tank having a cap thereon removably disposed with respect to said chamber and formed for insertion in said drain lock chamber through the aperture therein for engagement with said outlet port to drain said piping means of irradiated liquid, closure means disposed within said drain lock chamber and including a plug formed to seal the aperture in said chamber, and an eccentric arm mounted for rotation in said chamber and carrying said plug whereby said plug is movable into and out of engagement with said aperture to open and close same, said plug having a square boss thereon and said drain tank cap having an indentation therein formed to mate with the boss upon said plug whereby rotation of said drain tank following contact of same with said plug removes said drain tank cap, and retaining means upon said plug adapted to hold said cap whereby subsequent movement of said plug to open position uncaps said drain tank and subsequent further insertion of said drain tank through said drain lock chamber into engagement with said outlet port provides direct communication between said piping means and said drain tank.

7. In a liquid handling system for radioactive materials having a liquid reservoir with an outlet port, the combination comprising means forming a chamber about said outlet port and having an aperture therein, a drain tank movable with respect to said chamber and having a tube extending therefrom for engagement with the aperture in said chamber, closure means within said chamber having open and closed positions with respect to the aperture thereof and including an operating shaft having a cam thereon, and interlock means engaging the shaft of said closure means and said drain tank and maintaining said drain tank tube in engagement with the aperture of said chamber when said closure means is in open position and releasing said drain tank by the cam on said operating shaft when said closure means is in closed position.

8. Fluid handling means for cooperation with a fluid system having an outlet port and comprising means forming a drain lock chamber about said outlet port and having an aperture therein, a movable drain tank for receiving a liquid from said fluid system through the outlet port thereof and having a tube extending therefrom for engagement with the aperture in said drain lock chamber, said drain tank tube having a cap removably engaging the end thereof, closure means disposed within said drain lock chamber and having open and closed positions with respect to the aperture therein, said closure means having an arm movable to operate same and holding means for engaging and removably retaining the cap of said drain tank tube whereby engagement of said drain tank tube with said drain lock chamber aperture engages said tube cap and said holding means and movement of said closure means to open position removes said cap to provide communication between said piping means and said drain tank and subsequent movement of said closure means to closed position closes the aperture in said drain lock chamber and caps said drain tank tube, and interlock means engaging said closure means arm and said drain tank to hold said drain tank tube in engagement with said drain lock chamber aperture when said closure means is in open position and to release said drain tank for removal when said closure means is in closed position.

9. In a liquid handling system for a radioactive target assembly having a reservoir the combination comprising a drain lock chamber adjacent said reservoir and communicating therewith through a pipe, said chamber having an aperture therein aligned with said pipe and internal closure means for said aperture adapted to move into and out of closing relation with said aperture, valve means within the pipe between said reservoir and chamber, a movable drain tank having a communicating tube extending therefrom with a removable cap thereon, said tank being movable to insert the tube thereof into the aperture in said drain lock chamber wherein said tube cap is engaged by said closure means and movement thereof to open position uncaps said drain tank tube, and said tank being further movable to insert the tube thereof through the chamber into engagement with the pipe between said drain lock chamber and said reservoir whereby operation of said valve means provides direct communication between said reservoir and drain tank without opening said reservoir to said drain lock chamber.

10. In a liquid handling system for radioactive materials having a liquid reservoir the combination comprising means defining a drain lock chamber adjacent said reservoir, first and second aligned pipes through opposite walls of said chamber with the first of said pipes communicating between said reservoir and chamber, valve means in said first pipe, closure means within said chamber movable between closed and open positions with respect to said second pipe and having cap retention means thereon, filter means removing air from said drain lock chamber for disposing of radioactive vapor therein, and a drain tank having a tube extending therefrom with a removable cap thereon, said tank being movable to insert the tube thereon into said second pipe wherein the tube cap is engaged by said closure means for uncapping said tube upon movement of said closure means to the open position thereof, and said tank being further movable to insert the tube thereof in slidable engagement within said first aligned pipe whereby actuation of said valve means provides direct communication between said reservoir and said drain tank.

References Cited in the file of this patent

UNITED STATES PATENTS

| | | |
|---|---|---|
| 173,093 | Wells | Feb. 1, 1876 |
| 769,132 | Graham | Aug. 30, 1904 |
| 1,780,605 | Shinney | Nov. 4, 1930 |
| 2,397,785 | Friedlander | Apr. 2, 1946 |
| 2,429,217 | Brasch | Oct. 21, 1947 |
| 2,552,986 | Lewis | May 15, 1951 |
| 2,574,842 | Prescott | Nov. 13, 1951 |

FOREIGN PATENTS

| | | |
|---|---|---|
| 303,065 | Great Britain | May 26, 1930 |